UNITED STATES PATENT OFFICE 2,602,087

OXYALKYLATION OF THE ESTERS OF CERTAIN AMINO ALCOHOLS

Melvin De Groote, University City, Mo., assignor to Petrolite Corporation, Ltd., Wilmington, Del., a corporation of Delaware No Drawing. Application November 12, 1948, Serial No. 59,769

7 Claims. (Cl. 260—404)

This invention is concerned with the treatment of certain water-insoluble esters, as hereinafter described, with an alpha-beta alkylene oxide having not over 4 carbon atoms, such as ethylene oxide, so as to render such product water-soluble or emulsifiable by conversion into derivatives, as hereinafter described. The particular esters subjected to such treatment are esters of certain amino-alcohols. Such esters are characterized by the absence of any reactive hydrogen atom.

It is common practice to treat water-insoluble materials, such as acids, amides, alcohols, phenols, mercaptans and the like, with an alkylene oxide, particularly ethylene oxide, so as to introduce a hydrophile radical. All such compounds are characterized by the fact that they have a reactive hydrogen atom, i. e., a hydrogen atom attached to oxygen, nitrogen or sulfur.

I have found that valuable emulsifying agents can be obtained by the oxyalkylation of certain esters of amino-alcohols, even though such esters do not contain a reactive hydrogen atom. Examples of such esters are the higher fatty acid esters of diethylethanolamine, dipropylethanolamine, dibutylethanolamine, diamylethanolamine, dicyclohexylethanolamine, dihexylethanolamine, dioctylethanolamine, etc. Other examples are the same comparable amines in which the ethanol radical is replaced by a propanol radical or a hydroxypropanol radical, a butanol radical, or a hydroxybutanol radical.

Such amines may be considered as the reaction product derived by reacting a secondary amine with an alkylene oxide selected from the class of ethylene oxide, propylene oxide, butylene oxide, glycide and methylglycide. For convenience, the secondary amines may be indicated thus:

in which R represents an alkyl or alicyclic, saturated hydrocarbon radical having 2 to 10 carbon atoms. Reaction with a single mole, or 2 or 3 moles of an alkylene oxide, results in the formation of a product of the following composition:

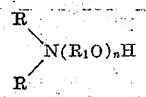

in which R has its prior significance and $R_1O$ is the divalent radical obtained from the alkylene oxide previously specified, and $n$ is the numeral 1 to 3. If such chemical compound is esterified with monocarboxy acid or its equivalent, one then obtains a compound of the following composition:

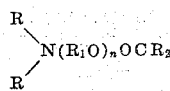

in which the characters have their previous significance and $R_2CO$ is the acyl radical of the monocarboxy detergent-forming acid having 8 to 20 carbon atoms. Such acids are exemplified by the higher fatty acids previously referred to, various naphthenic acids, and resin acids such as abietic acid, hydrogenated abietic acid, etc. Such acids are characterized by the fact that they combine with alkalis to produce soap and soap-like materials. Thus, they are frequently referred to as detergent-forming acids.

Re-examining the last formula previously referred to, it is to be noted that such product does not contain a reactive hydrogen atom. I have found, however, that such ester of an amino-alcohol, even though water-insoluble and showing no appreciable tendency to emulsify prior to treatment with an alkylene oxide, can be treated with an alkylene oxide, particularly ethylene oxide, so as to obtain a water-soluble product which seems to be a mixture, and the exact nature of which is not known at the moment. Presumably, in part, the product would appear to be the resultant of a reaction where the ethylene oxide enters at the carbonyl carbon position in a manner indicated in the following way:

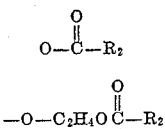

There would be no difference, of course, if the ethylene oxide were considered as entering between the radical R₁ and the adjacent oxygen atom.

This is shown in the following:

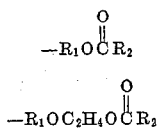

Actually, it is believed that the reaction which takes place is somewhat more complex than the simpler suggestions previously presented. For instance, there may be a rupture involving one fragment at the carbonyl carbon atom and another fragment at the adjoining oxygen atom. This is shown in the following manner:

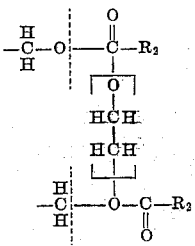

One valency bond is severed, as indicated by broken line, and replaced by valency bond connected with the divalent epoxy radical. Obviously, it is not intended to show any abnormal valency for carbon.

Assuming that part of the reaction or reactions may be explained by a rupture, as above indicated, it is a matter of further speculation as to what happens to the two amino-alcohol residues, as differentiated from the acyl and acyloxy residues. The two might simply unite, as indicated in the following manner:

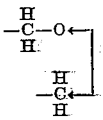

or it might be possible, of course, that another mole of ethylene oxide furnishes a connective divalent radical, as indicated in the following:

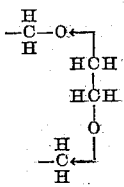

The fact that the resultant obtained from a single ester does not always yield products which are uniform, and also the fact that comparable materials prepared by increased oxyethylation of the secondary amine prior to esterification act somewhat differently, both as emulsifiers for oil-in-water emulsions and as demulsifiers for water-in-oil emulsions, indicates that even though I do not know the composition completely, it probably represents, at least in part, other reaction products in addition to those which have been briefly indicated. Regardless of the composition, it is to be noted that my invention is directed to the substantial fact that I have found that these particular esters, free from reactive hydrogen atoms, are susceptible to oxyalkylation and yield products of utility.

Previously reference has been made to the higher fatty acids which represent my preferred reactants. The higher fatty acids include caprylic acid, capric acid, lauric acid, myristic acid, palmitic acid, stearic acid, as well as hydroxystearic acid, dihydroxystearic acid, trihydroxystearic acid, etc., as well as the unsaturated higher fatty acids, such as oleic acid, linoleic acid, linolenic acid, ricinoleic acid, etc. Previous reference has been made to the use of naphthenic acids, and particularly naphthenic acids of commerce, in the two grades ordinarily available, to wit, 220–230 acid number and 230–240 acid number. The invention can be illustrated by such examples as the oleic acid ester, ricinoleic acid ester, or linoleic acid ester of diethylethanolamine or dibutylethanolamine. The following examples illustrate the oxyalkylation procedure particularly its oxyethylation, which is comparatively simple and more or less conventional and is employed in reacting compounds which happen to have a reactive hydrogen atom. In the absence of such reactive hydrogen atom, one might expect that somewhat more drastic or vigorous methods of oxyalkylation would be required. Actually, this is not the case and the explanation may be due to the fact that the ester itself is basic. Basic amines, such as secondary alkyl amines, are very susceptible to oxyalkylation. Probably the basicity of the ester in the present instance may be an explanation of this comparatively ease of oxyalkylation.

There may be an anomaly in the fact that reference has been made to the absence of reactive hydrogen atoms in the ester which is subjected to oxyalkylation, and at the same time, esters of ricinoleic acid, hydroxystearic acid, and the like have been included. Ethylene oxide reacts with primary alcohols. Apparently, however, under ordinary conditions of reaction, or even under the more drastic conditions of reaction herein described, ethylene oxide or the other alkylene oxides, do not react with the secondary alcoholic radical which is part of an acyl radical, as in the case of ricinoleic acid, hydroxystearic acid, etc. In fact, if ricinoleic acid or ethyl ricinoleate is subjected to oxyalkylation, particularly oxyethylation, one does not obtain a compound in which the alcoholic hydroxyl of the ricinoleyl radical has been attacked.

The same applies in connection with the compounds herein described, if one happens to employ an ester in which the ricinoleyl or similar group is present. If the final product is subjected to saponification and then acidified and extracted so as to recover the fatty acid as such, examination of the fatty acid reveals that it is the unaltered original fatty acid and not the fatty acid of the following type:

$$H(OR_1)_nOR_3COOH$$

wherein R₁O represents a divalent alkylene oxide radical and HOR₃COOH represents ricinoleic acid, hydroxystearic acid, or the like.

The selected ester is placed in a stirring autoclave and subjected to treatment with ethylene oxide or one of the other similar alkylene oxides, as noted. Since these esters are basic, there is no need to add a cataylst, as it is sometimes employed in oxyethylation, the addition of an alkaline catalyst being common in numerous instances. In the following examples, the pressure is given in pounds per square inch. As the reaction becomes complete, the pressure drops to a very low value.

Example 1

| | Grams |
|---|---|
| Diethylethanolamine stearyl ester | 381 |
| Ethylene oxide (5 portions of 150 g. each) | 750 |

| Time | Temperature | Pressure | |
|---|---|---|---|
| | °C. | p. s. i. | |
| 2:20 | 100 | 150 | |
| 2:30 | 150 | 200 | |
| 2:50 | 160 | 80 | Emulsifiable. |
| 3:10 | 160 | 30 | |
| 3:10 | 160 | 30 | |
| 3:55 | 100 | 130 | |
| 4:05 | 155 | 115 | Non-homogeneous, viscous, reddish amber; some insolubility in water solution. |
| 4:20 | 160 | 40 | |
| 4:25 | 160 | 30 | |
| 9:50 | 100 | 130 | |
| 10:00 | 170 | 80 | Emulsifiable—not soluble. |
| 10:30 | 160 | 45 | |
| 10:30 | 160 | 45 | |
| 3:30 | 100 | 120 | |
| 3:35 | 150 | 85 | Grainy, viscous, reddish-amber, partially soluble. |
| 4:10 | 165 | 50 | |
| 10:15 | 100 | 120 | |
| 10:25 | 150 | 65 | Grainy, viscous, reddish-amber, soluble. |
| 1:15 | 165 | 45 | |

The product obtained from the above batchwise oxyethylation, weighed approximately 1125 grams. It was mixed with 125 grams of xylene and 125 grams of the diethylether of diethyleneglycol. This mixture was then warmed until solution was complete and employed as such for various purposes, such as an emulsifier of oil-in-water emulsions, an additive to slush oils, so as to introduce corrosion-preventing properties, a break-inducer in the doctor treatment of sour hydrocarbons, etc.

Example 2

The same procedure was followed as in Example 1, preceding, except that there were 8 additions of ethylene oxide (150 grams per addition) and the final product was almost completely soluble, having only a very slight amount of insoluble material. 100 grams of xylene and 100 grams of the diethylether of diethyleneglycol were added so as to produce a completely homogeneous solution, as in Example 1, preceding.

The operating conditions during the addition of the last three portions of ethylene oxide were comparable to those noted in the preceding example. In other words, the total time required varied from one hour to two hours, the temperature employed in each instance rose to about 160–165° C., during the last part of the oxyethylation, and the pressure varied from 120 to 130 pounds maximum, to approximately 30 to 45 pounds, during the last stages of oxyethylation.

Example 3

The same procedure was employed as in Examples 1 and 2, preceding, except that the ester subjected to oxyethylation was the diethylethanolamine oleyl ester. The amount of the ester employed was 379 grams, instead of 381 grams, as in Examples 1 and 2, preceding. Otherwise, the operating conditions in regard to time required, temperature required, and pressure required, were substantially the same. The same solvents were added as before.

Example 4

The same procedure was employed as in Examples 1 and 2, preceding, except that the ester subjected to oxyethylation was the diethyl ethanolamine ricinoleyl ester. The amount of the ester employed was 395 grams, instead of 381 grams, as in Examples 1 and 2, preceding. Otherwise, the operating conditions in regard to time required, temperature required, and pressure required, were substantially the same.

Example 5

The same procedure was followed as in the four preceding examples, except that the corresponding esters of dibutylethanolamine were employed instead of the esters of diethylethanolamine. In such instances where, in the previous examples, 381 grams of the ester were employed, there was substituted 437 grams of the dibutyl ester. Where 379 grams of the diethyl ester were employed, there was substituted 435 grams of the dibutyl ester. Likewise, in the example where 395 grams of the diethyl ester were employed, there was substituted 451 grams of the dibutyl ester. The conditions of oxyethylation were substantially the same as in the previous examples, the ranges of time, temperature and pressure being substantially as before. The only variation was that in following the procedure of Example 1, apparently somewhat more ethylene oxide was required to give suitable solubility; thus, the 750 grams of ethylene oxide employed in Example 1 were increased to 900 grams, using six batches of 150 grams each, instead of five batches. The sixth batch was added under substantially the same conditions as the fifth batch noted in Example 1. Mixtures of solvents were the same as before, that is, a mixture of xylene and the diethylether of diethyleneglycol.

When propylene oxide was used, the amount of alkylene oxide was increased one-third over the values where ethylene oxide was employed, i. e., 200 grams of propylene oxide were used to replace 150 grams of ethylene oxide. Propylene oxide does not give nearly as satisfactory a product, due to lesser water solubility. It is most advantageous to use either ethylene oxide alone, or a mixture of ethylene oxide and propylene oxide, particularly using propylene oxide in the early batches and ethylene oxide in the later batches. When propylene oxide is used, the pressure may be less, due to the lower vapor tension of propylene oxide, but its reactivity is lower and the time required may be two or three times that required with ethylene oxide. Sometimes slightly higher temperatures must be employed with propylene oxide. For various reasons, the most desirable, the cheapest and the most effective alkylene oxide is ethylene oxide. The objection to glycide is its expense and the extreme care with which it must be handled.

Some of the esters employed as raw materials, for instance, the higher fatty acid esters of diethylethanolamine, can be distilled and are available as pale amber liquids which darken readily in presence of air or sometimes due to the action of light alone. The products obtained by oxyalkylation vary from deep amber to a deep, reddish appearance, and are either liquids or mixtures which seem to be liquids, possibly pasty solids. The solvents added as above described reduce them all to dark amber-colored liquids of attractive uniformity and viscosity.

It is to be noted that the esters, prior to oxyalkylation, are water-insoluble. This, of course, does not refer to water which has been acidulated with acids of various kinds. This insolubility prevails in the esters prior to oxyalkylation, regardless of whether $n$ in

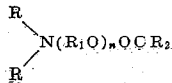

happens to be 1, 2 or 3. Ordinarily, I prefer that it be 1. The products, as prepared, will make a solution with warm distilled water, using 1 to 5 parts of the oxyalkylated derivative mixture and 95 to 99 parts of warm distilled water (temperature 30° to 50° C.) to give a permanent solution or sol. In some instances, practically a clear solution is obtained. This test applies whether the product is used as such, or whether it has been mixed with xylene and the diethylether of diethyleneglycol, as previously pointed out. Such mixtures are by weight.

Having thus described my invention, what I claim as new and desire to secure by Letters Patent is:

1. The process of rendering water-insoluble esters water-dispersible by reaction with an alkylene oxide; said water-insoluble ester, prior to oxyalkylation, being of the following formula:

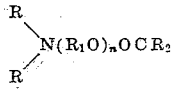

in which R is a saturated hydrocarbon radical having at least 2 and not over 10 carbon atoms; $R_1O$ is the divalent radical in which $R_1O$ is a member selected from the class consisting of ethylene radicals, propylene radicals, butylene radicals, hydroxypropylene radicals and hydroxybutylene radicals, and $n$ is a number varying from 1 to 3; $R_2CO$ is the acyl radical of a monocarboxy detergent-forming acid having 8 to 20 carbon atoms; said ester being characterized by the absence of labile hydrogen atoms which are reactive towards low molal alkylene oxides; said alkylene oxide having at least 2 and not more than 4 carbon atoms selected from the class consisting of ethylene oxide, propylene oxide, butylene oxide, glycide and methylglycide, said reaction being carried out by subjecting the ester to the action of the alkylene oxide under oxyalkylating conditions of temperature and pressure and being at least sufficient to render the water-insoluble ester water-dispersible to a degree sufficient to give a permanent solution in mixtures containing 1% to 5% of the oxyalkylated derivative mixture and 95% to 99% of warm distilled water.

2. The process of claim 1, wherein $n$ is 1.
3. The process of claim 1, wherein $n$ is 1 and $R_1$ is the $C_2H_4$ radical.
4. The process of claim 1, wherein $n$ is 1, $R_1$ is the $C_2H_4$ radical, and R is a $C_2H_5$ radical.
5. The process of claim 1, wherein $n$ is 1, $R_1$ is the $C_2H_4$ radical, R is a $C_2H_5$ radical, and $R_2CO$ is the acyl radical of a higher fatty acid.
6. The process of claim 1, wherein $n$ is 1, $R_1$ is the $C_2H_4$ radical, R is a $C_2H_5$ radical, and $R_2CO$ is the acyl radical of an unsaturated higher fatty acid.
7. The process of claim 1, wherein $n$ is 1, $R_1$ is the $C_2H_4$ radical, R is a $C_2H_5$ radical, $R_2CO$ is the acyl radical of an unsaturated higher fatty acid, and the alkylene oxide used in the oxyalkylation reaction is ethylene oxide.

MELVIN DE GROOTE.

REFERENCES CITED

The following references are of record in the file of this patent:

UNITED STATES PATENTS

| Number | Name | Date |
|---|---|---|
| 1,970,578 | Schoeller et al. | Aug. 21, 1934 |
| 1,985,424 | Piggott | Dec. 25, 1934 |
| 2,137,314 | Ulrich et al. | Nov. 22, 1938 |
| 2,312,135 | Ulrich et al. | Feb. 23, 1943 |
| 2,390,080 | De Groote et al. | Dec. 4, 1945 |
| 2,390,942 | Katzman et al. | Dec. 11, 1945 |